(12) United States Patent
Balasubramanian et al.

(10) Patent No.: US 11,570,651 B2
(45) Date of Patent: Jan. 31, 2023

(54) LOW POWER SENSING FOR PEDESTRIAN USER EQUIPMENTS (P-UES)

(71) Applicant: QUALCOMM Incorporated, San Diego, CA (US)

(72) Inventors: Anantharaman Balasubramanian, San Diego, CA (US); Shuanshuan Wu, San Diego, CA (US); Tien Viet Nguyen, Bridgewater, NJ (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/137,037

(22) Filed: Dec. 29, 2020

(65) Prior Publication Data

US 2021/0211920 A1    Jul. 8, 2021

Related U.S. Application Data

(60) Provisional application No. 62/957,605, filed on Jan. 6, 2020.

(51) Int. Cl.
*H04W 28/02* (2009.01)
*H04W 72/04* (2009.01)
(Continued)

(52) U.S. Cl.
CPC ... *H04W 28/0221* (2013.01); *H04W 52/0238* (2013.01); *H04W 72/044* (2013.01); *H04W 72/048* (2013.01); *H04W 72/1231* (2013.01)

(58) Field of Classification Search
CPC ......... H04W 28/0221; H04W 28/0284; H04W 28/0294; H04W 4/40; H04W 52/0238;
(Continued)

(56) References Cited

U.S. PATENT DOCUMENTS

2013/0138831 A1* 5/2013 Patil ..................... H04W 8/005
709/235
2018/0054780 A1* 2/2018 Radulescu ........ H04W 52/0219
(Continued)

FOREIGN PATENT DOCUMENTS

EP     3457785 A1    3/2019
WO  2018145067 A1    8/2018

OTHER PUBLICATIONS

International Search Report and Written Opinion—PCT/US2020/067444—ISA/EPO—dated Jun. 17, 2021.

*Primary Examiner* — Kashif Siddiqui
(74) *Attorney, Agent, or Firm* — Patterson + Sheridan LLP

(57) ABSTRACT

Certain aspects of the present disclosure provide techniques for low power channel sensing for pedestrian user equipments (P-UEs). A method that may be performed by a UE (e.g., such as a P-UE) includes determining a level of channel congestion for a channel during a first sensing duration. The method includes determining a second sensing duration and a transmission duration based on the level of channel congestion for the channel determined from the first sensing duration. The method includes sensing the channel for the second sensing duration. The method includes transmitting on the channel for the transmission duration.

28 Claims, 9 Drawing Sheets

(51) Int. Cl.
*H04W 52/02* (2009.01)
*H04W 72/12* (2009.01)

(58) Field of Classification Search
CPC ............. H04W 72/044; H04W 72/048; H04W 72/1231; H04W 74/0808; H04W 92/18; Y02D 30/70
See application file for complete search history.

(56) References Cited

U.S. PATENT DOCUMENTS

2019/0132832 A1* 5/2019 Uchiyama ............. H04W 72/04
2021/0306828 A1* 9/2021 Panteleev ............... H04W 4/06

* cited by examiner

LOW POWER SENSING FOR PEDESTRIAN USER EQUIPMENTS (P-UES)

CROSS-REFERENCE TO RELATED APPLICATION(S)

This application claims benefit of and priority to U.S. Provisional Application No. 62/957,605, filed Jan. 6, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for low power channel sensing, for example, for pedestrian user equipments (P-UEs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include low power channel sensing.

One or more aspects of the subject matter described in this disclosure can be implemented in an apparatus for wireless communication by a user equipment (UE). The apparatus generally includes a memory and at least one processor coupled with the memory. The at least one processor coupled with the memory is generally configured to determine a level of channel congestion for a channel during a first sensing duration. The at least one processor coupled with the memory is generally configured to determine a second sensing duration and a transmission duration based on the level of channel congestion for the channel determined from the first sensing duration. The at least one processor coupled with the memory is generally configured to sense the channel for the second sensing duration. The at least one processor coupled with the memory is generally configured to transmit on the channel for the transmission duration.

One or more aspects of the subject matter described in this disclosure can be implemented in a method for wireless communication by a UE. The method generally includes determining a level of channel congestion for a channel during a first sensing duration. The method generally includes determining a second sensing duration and a transmission duration based on the level of channel congestion for the channel. The method generally includes sensing the channel for the second sensing duration. The method generally includes transmitting on the channel for the transmission duration.

One or more aspects of the subject matter described in this disclosure can be implemented in an apparatus for wireless communication. The apparatus generally includes means for includes determining a level of channel congestion for a channel during a first sensing duration. The apparatus generally includes means for determining a second sensing duration and a transmission duration based on the level of channel congestion for the channel. The apparatus generally includes means for sensing the channel for the second sensing duration. The apparatus generally includes means for transmitting on the channel for the transmission duration.

One or more aspects of the subject matter described in this disclosure can be implemented in a computer readable medium having computer executable code stored thereon. The computer readable medium having computer executable code stored thereon generally includes code for determining a level of channel congestion for a channel during a first sensing duration. The computer readable medium having computer executable code stored thereon generally includes code for determining a second sensing duration and a transmission duration based on the level of channel congestion for the channel. The computer readable medium having computer executable code stored thereon generally includes code for sensing the channel for the second sensing duration. The computer readable medium having computer executable code stored thereon generally includes code for transmitting on the channel for the transmission duration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
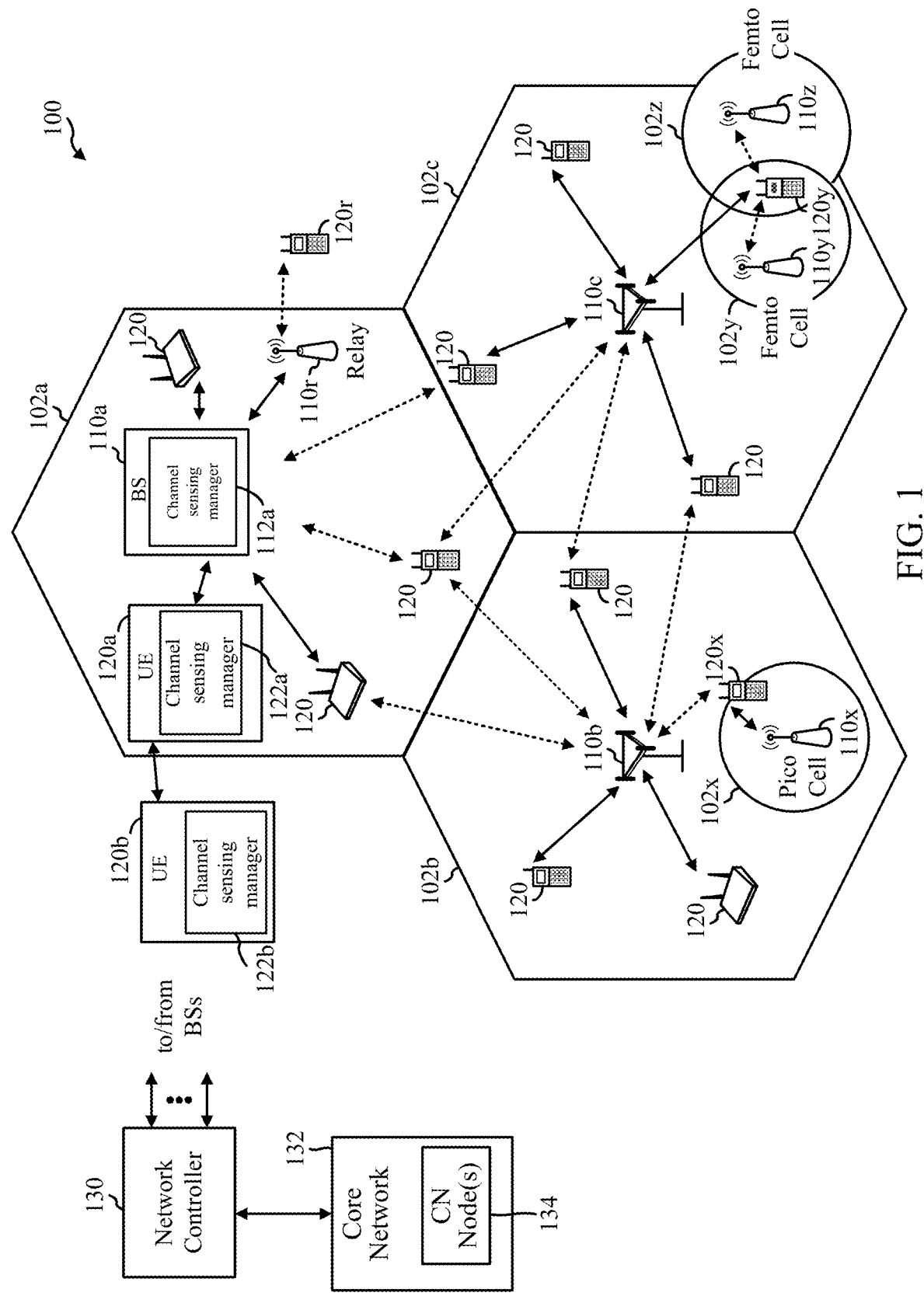
FIG. 1 is a block diagram conceptually illustrating an example telecommunications system, in accordance with certain aspects of the present disclosure.

Aspects of the present disclosure provide apparatus, methods, processing systems, and computer readable mediums for low power channel sensing, for example, for pedestrian user equipments (P-UEs).

The following description provides examples of low power channel sensing, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems including later technologies.

NR access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR may also support beamforming and beam direction may be dynamically configured. Multiple-input multiple-output (MIMO) transmissions with precoding may also be supported. In some examples, MIMO configurations in the downlink (DL) may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for sidelink communications. As shown in FIG. 1, the UE 120a includes a channel sensing manager 122a, the UE 120b includes a channel sensing manager 122b, and the BS 110a includes a channel sensing manager 112a. The channel sensing manager 122a, the channel sensing manager 122b, and/or the channel sensing manager 112a may be configured for low power channel sensing, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul.

Figure 2:
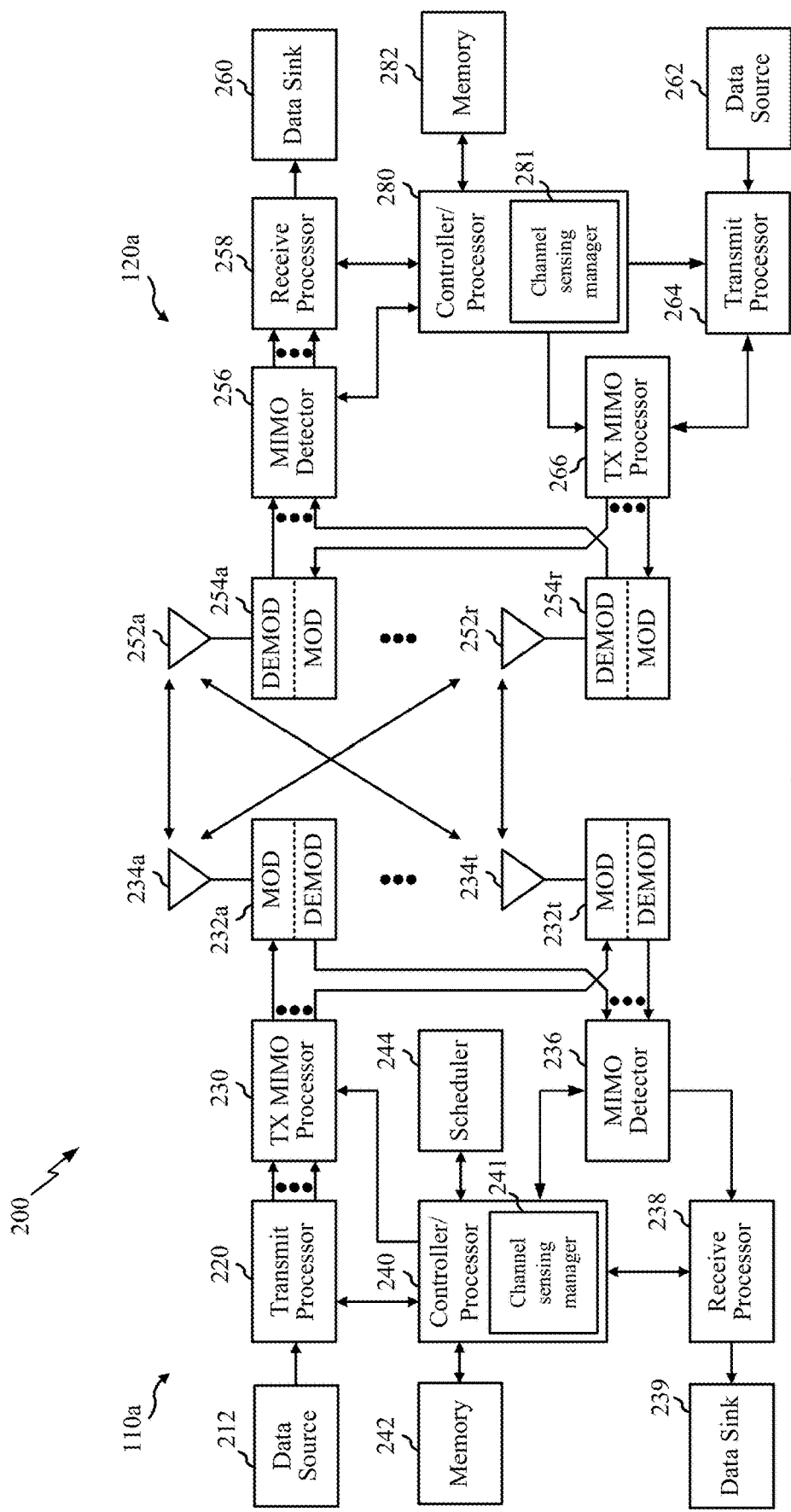
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At the UE 120a, the antennas 252a-252r may receive the DL signals from the BS 110a, or sidelink signals from the UE 120b, and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the UL signals from the UE 120a may be received by the antennas 234, processed by the modulators, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memory 242 and memory 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238 may be used to perform the various techniques and methods described herein. For example, as shown in FIG. 2, the controller/processor 280 of the UE 120a has a channel sensing manager 281 and the controller/processor 240 of the BS 110a has a channel sensing manager 241. The channel sensing manager 281 and/or the channel sensing manager 241 may be configured for low power channel sensing, in accordance with aspects of the disclosure.

NR may utilize orthogonal frequency division multiplexing (OFDM) with a cyclic prefix (CP) on the UL and DL. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
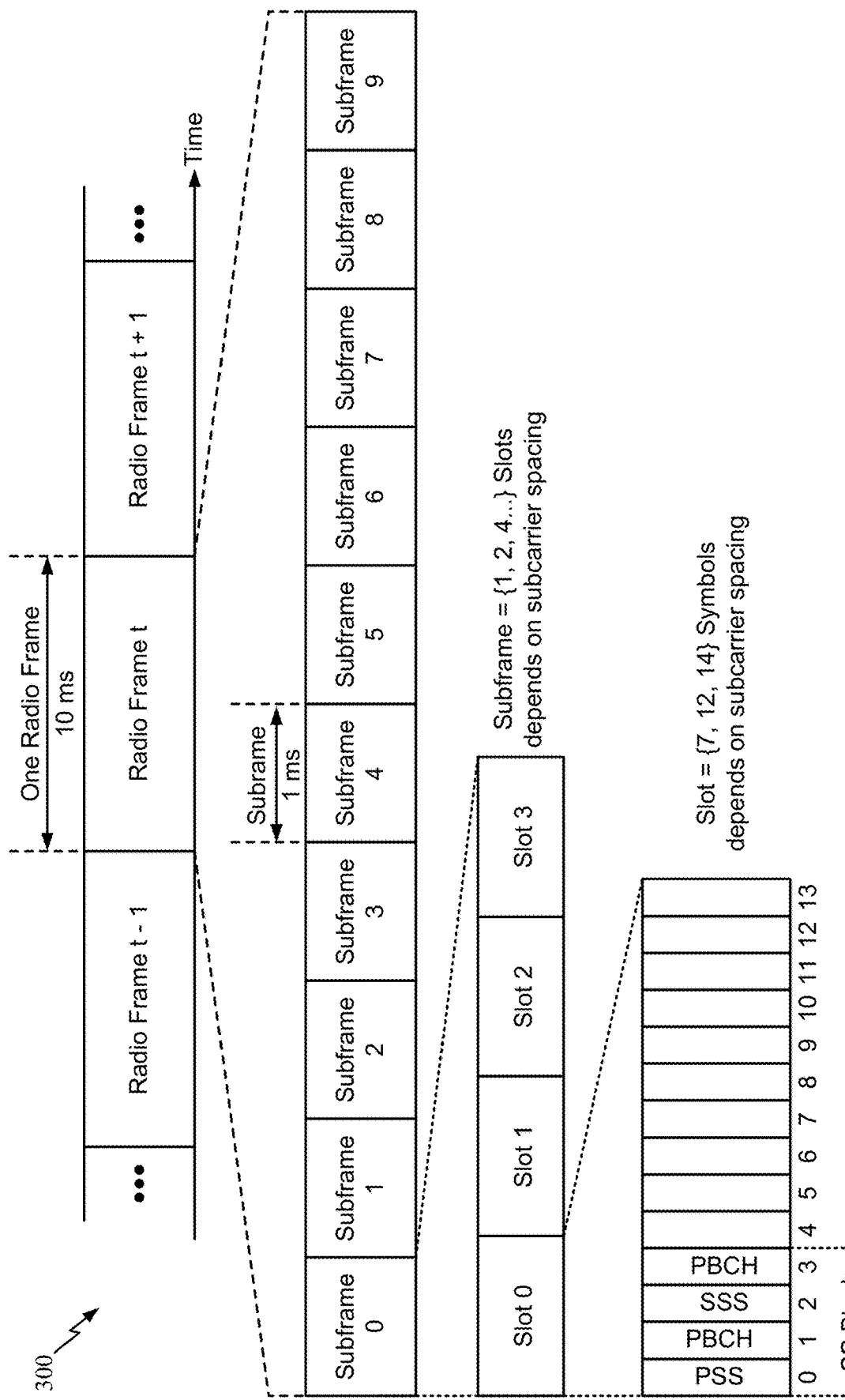
FIG. 3 is a frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which may use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Information (e.g., such as traffic conditions, weather conditions, congestion statistics, sensor data, etc.) can be broadcast to UEs in the coverage area. Relays can re-broadcast information received from some UEs. UE-type RSUs may be a reliable synchronization source.

Figure 4:
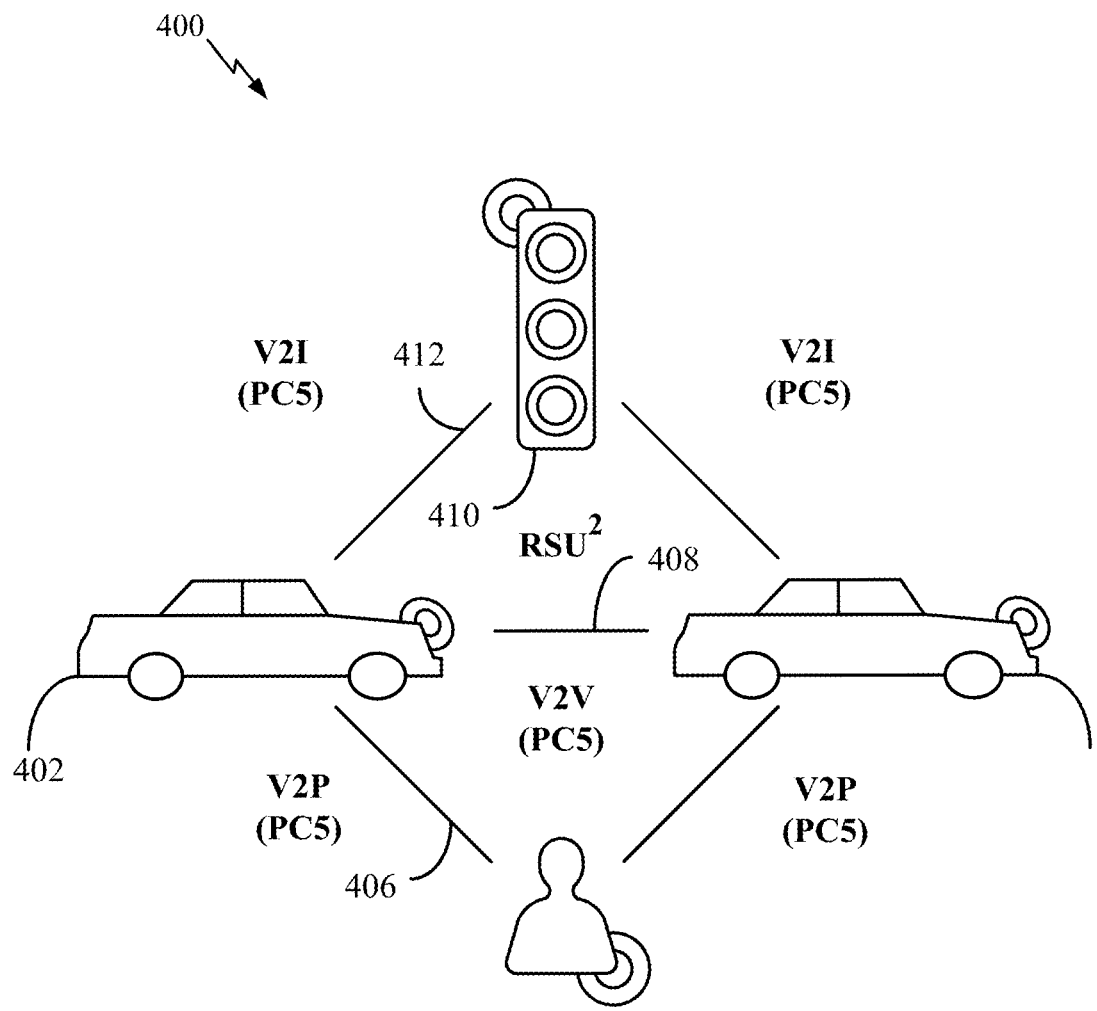
FIG. 4 illustrates an example vehicle-to-everything (V2X) communication system, in accordance with certain aspects of the present disclosure.
Figure 5:
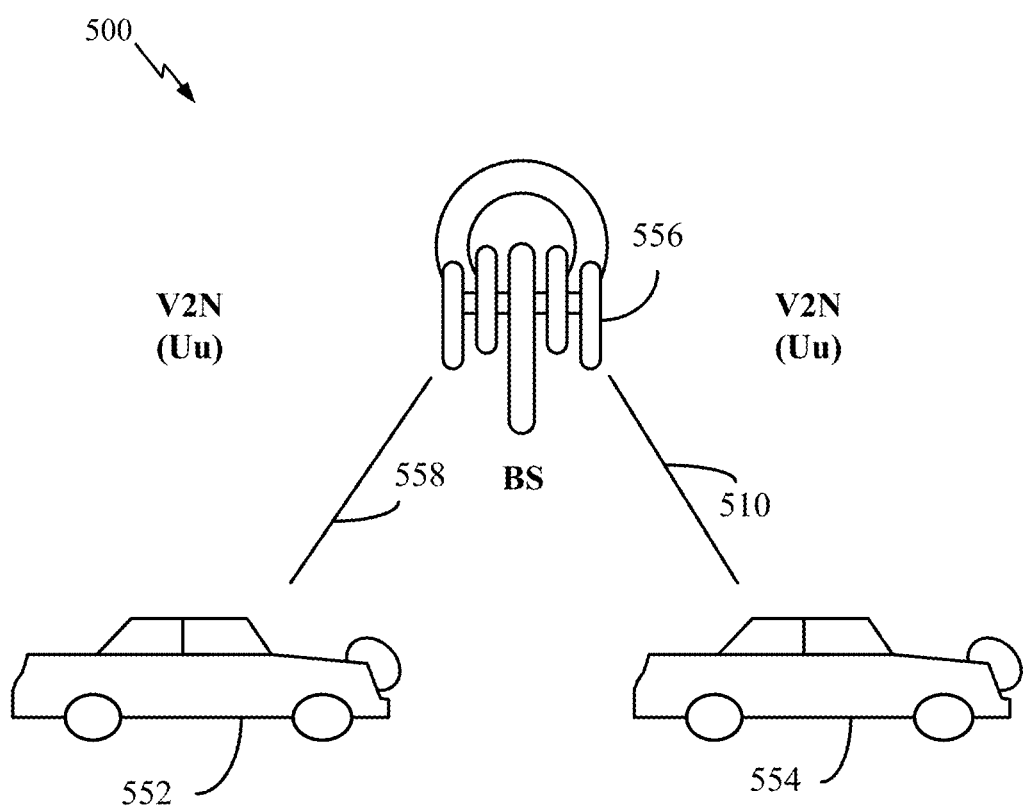
FIG. 5 illustrates another example V2X communication system, in accordance with certain aspects of the present disclosure.

FIG. 4 and FIG. 5 show diagrammatic representations of example V2X systems, in accordance with some aspects of the present disclosure. For example, the vehicles shown in FIG. 4 and FIG. 5 may communicate via sidelink channels and may perform sidelink CSI reporting as described herein.

The V2X systems, provided in FIG. 4 and FIG. 5 provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 550 for communication between a vehicle 552 and a vehicle 554 through a network entity 556. These network communications may occur through discrete nodes, such as a BS, that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Channel sensing may be used by UEs in order to allow multiple UEs to coexist, for example, in a V2X network. Channel sensing may allow UEs to avoid collisions with other UEs' transmissions. For example, channel sensing may allow a sensing UE to know the resource usage in the channel, so that the sensing UE can avoid transmitting on resources that are currently being used by other UEs.

Channel sensing involves overhead. For example, it takes time (e.g., 100 ms) for UEs to perform the channel sensing to obtain the channel resource usage. In certain systems, such as for vehicle UEs (V-UEs), channel sensing may be performed before every new transmission. Some UEs, such as P-UEs for example, may have a limited power budget (e.g., as compared to V-UEs). Thus, lower power channel sensing may be desirable to preserve power, while also avoiding collisions (e.g., or reducing the probability of collisions) with other UEs' transmissions.

Example Low Power Channel Sensing for
Pedestrian User Equipments (P-UEs)

The effective transmission power efficiency for channel sensing by a user equipment (UE) may be defined as the ratio of actual power spent on transmission to the sum of total power spent on transmission and sensing. Thus, the effective transmission power efficiency decreases with increased sensing.

Figure 6:
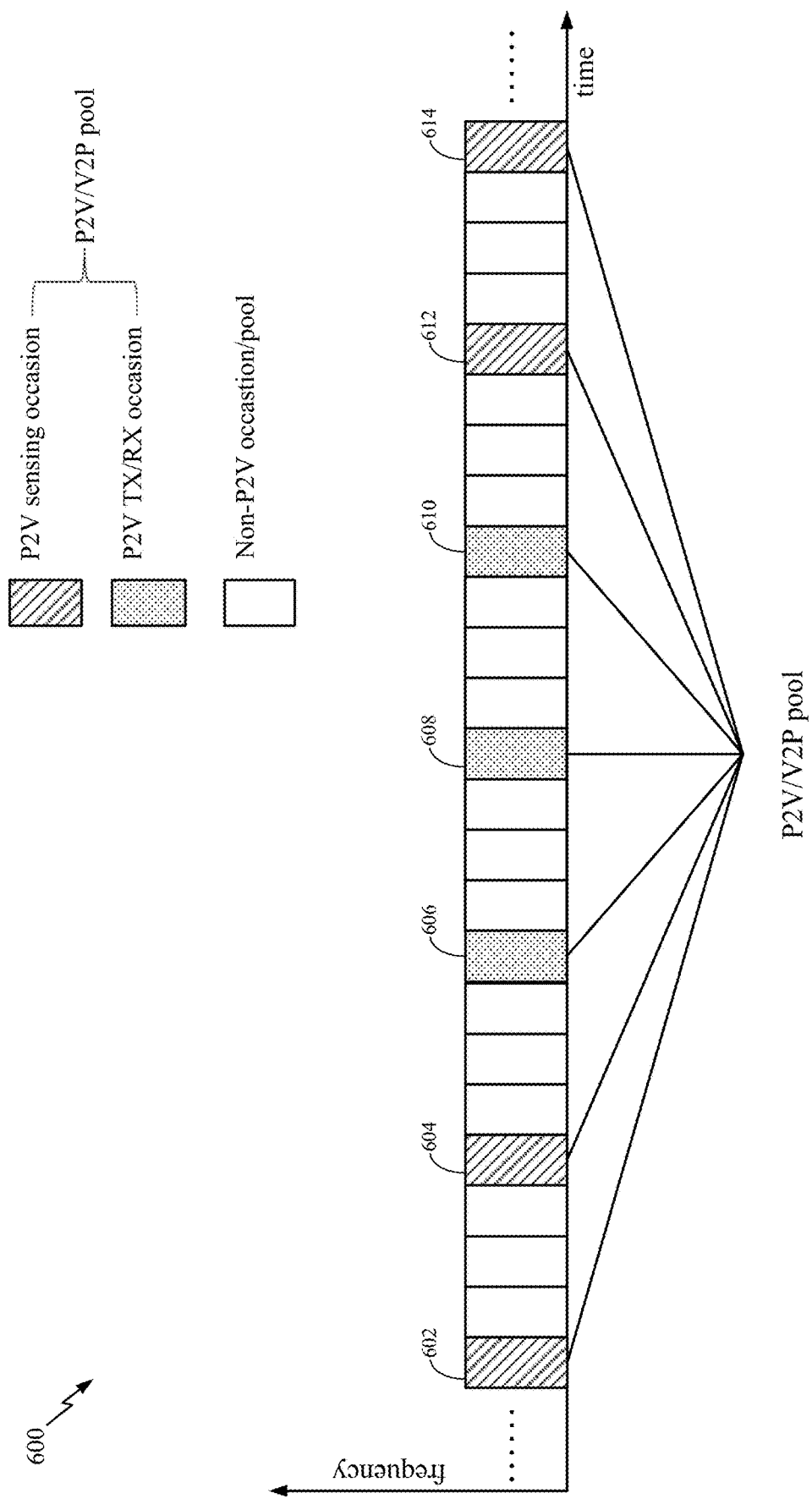
FIG. 6 is a diagram illustrating example resource pools, in accordance with certain aspects of the present disclosure.

In some examples, resources used for pedestrian-to-vehicle (P2V) and/or vehicle-to-pedestrian (V2P) communications may be in resource pools. FIG. 6 is a diagram illustrating example resource pools, in accordance with certain aspects of the present disclosure. As shown in FIG. 6, P2V/V2P resources may be time division multiplexed (TDMed) with non-P2V/V2P resources. In some examples, the resources for channel sensing (e.g., P2V sensing occasions) and the resources for transmissions (e.g., P2V transmit (TX)/receive (RX) occasions) may be defined in terms of slots and/or subframes.

According to certain aspects, the UE (e.g., a pedestrian UE (P-UE)) may adaptively determine the channel sensing duration and/or transmission duration. For example, the UE may adaptively determine the channel sensing and/or transmission durations based on a level of channel congestion for a channel. In some examples, during periods of light channel loading (e.g., lower levels of channel congestion), the UE may maximize the transmission time. During periods of high channel loading (e.g., higher levels of channel congestion), the UE may minimize collisions by increasing the channel sensing time to obtain better resource map usage, while maintaining the desired ratio of transmission time to sensing time. In some examples, based on the level of channel congestion for the channel, the UE may use full channel sensing for transmission at times and may use random transmission (e.g., with no channel sensing) at other times.

According to certain aspects, the channel congestion may be measured as a channel busy ratio (CBR), a percentage of resources deemed free by control decoding, and/or a signal quality measurement, such as reference signal received power (RSRP), received signal strength indicator (RSSI), or other measurement.

In some examples, the UE (e.g., the P-UE) performs the measurement of channel congestion. In some examples, another device (e.g., a V-UE) performs the channel congestion measurement and sends an indication to the UE of the level of channel congestion.

In some examples, the UE may compare the channel congestion level to a threshold. Accordingly, the channel sensing may be adapted based on whether or not the channel congestion exceeds a threshold. That is, an initial channel sensing (or coarse channel sensing) may be performed to obtain an initial channel congestion estimate (shown as the first P2V sensing occasion 602 in FIG. 6). Based on this initial channel congestion estimate, adaptation of further sensing periods may be determined. In some examples, the UE may adjust the channel sensing based on a configured association of the channel congestion to channel sensing/transmission times/ratio (e.g., based on a configured table, mapping, etc.).

According to certain aspects, the UE may be configured to wake up periodically (e.g., every N slots). When the UE wakes up, the UE may perform channel sensing (e.g., for the P2V pool) during a number of slots $n_1$ (e.g., logically consecutive sensing slots in the P2V resource pool) to determine the resource availability. The UE may then communicate (e.g., continuously transmit/receive), during $n_2$ available slots (e.g., logically consecutive TX/RX slots in the P2V resource pool). According to aspects of the disclosure, the UE may adaptively determine the $n_1$ and $n_2$ parameters based on the level of channel congestion. For example, in the slot when the UE wakes, the UE may determine (e.g., measure or receive) the level of channel congestion and determine the $n_1$ and $n_2$ parameters (sensing and transmitting/receiving parameters, respectively).

In an illustrative example, a P-UE may begin with a sensing parameter m=1. The P-UE may measure the channel in the first slot. If the CBR<x (e.g., x=0.2), then the P-UE ceases to sense for more slots (e.g., the congestion is low, so the UE maximizes transmission time). That is, the P-UE infers the resource map from the $n_1$=1 sensing duration and performs transmission thereafter for a configured $n_2$ slots. On the other hand, if x<CBR<y (e.g., x=0.2, y=0.3), the P-UE may perform sensing of an additional slot to obtain the resource map before transmitting. That is, in this case, m=2 slots (for sensing). And if CBR>z (e.g., z=0.9), the P-UE may sense for m=5 slots (e.g., because the channel is very congested).

After the sensing phase, the P-UE chooses the $n_2$ parameter and transmits in the $n_2$ slots (e.g., continuously). In some examples, the $n_2$ parameter may be chosen based on a target transmit power efficiency ratio and the m parameter. For the example, the desired transmit power efficiency ratio (η) may be defined to be $$\eta = \frac{n_2}{n_1 + n_2}.$$

In some examples, the transmit power efficiency parameter η may be a decreasing function of channel congestion (e.g., CBR). That is, more continuous transmissions can be performed (e.g., higher $n_2$ parameter used) if channel congestion is less.

For example, as shown in FIG. 6, a UE (e.g., P-UE) may be configured to wake-up every four slots for P2V (e.g., N=4 resource pool). The UE may begin with a sensing parameter m=2 and the parameter $n_2$=3. Thus, the UE may be configured to perform sensing (e.g., measure the channel) in the first two logically consecutive slots in the P2V resource pool, P2V sensing occasion 602 and P2V sensing occasion 604, then transmit and/or receive on the channel in the next three logically consecutive slots, P2V TX/RX occasion 606, P2V TX/RX occasion 608, and P2V TX/RX occasion 610, then perform sensing in the next two logically consecutive slots, P2V sensing occasion 612 and P2V sensing occasion 614, and so on.

Figure 7:
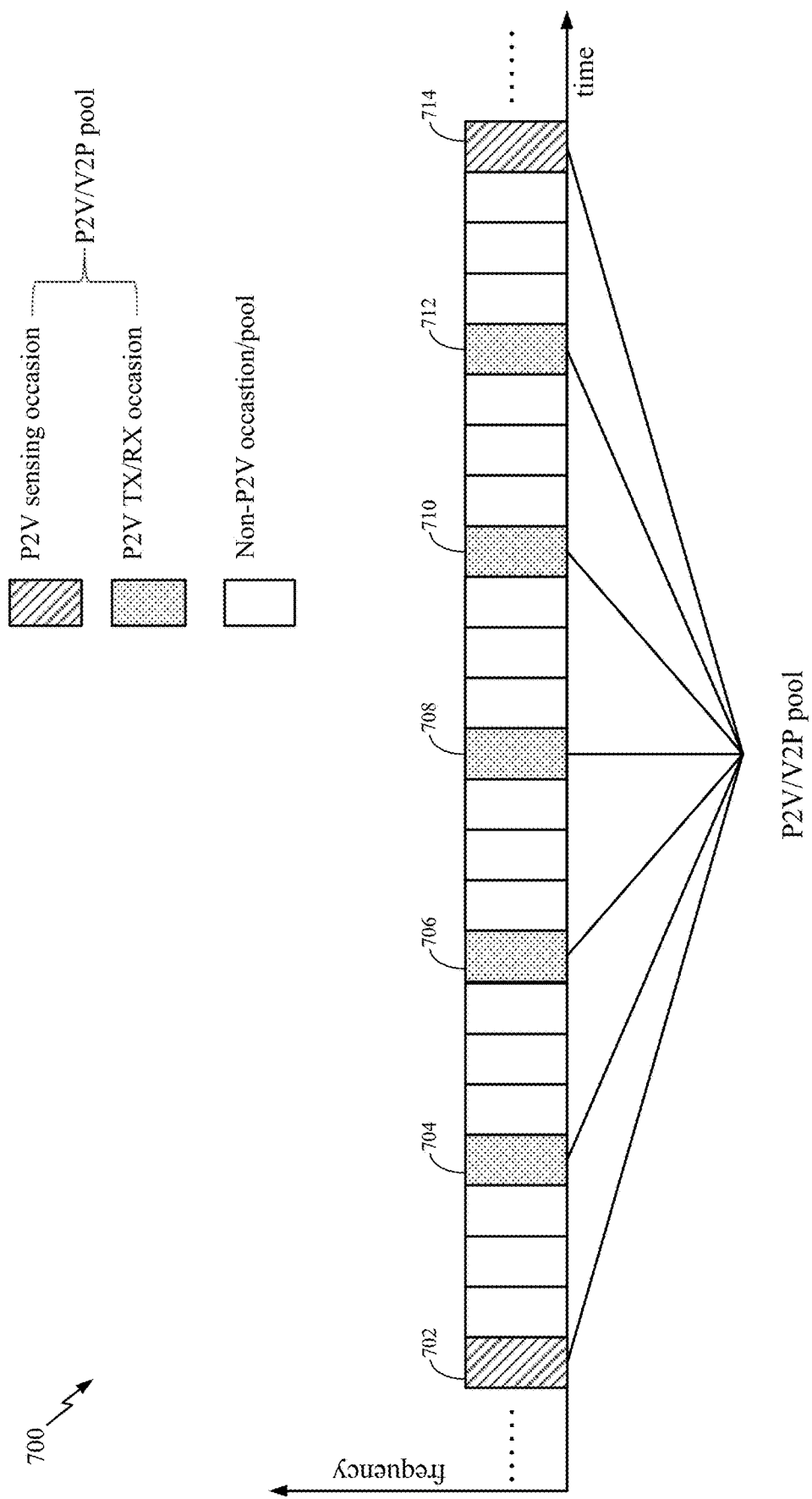
FIG. 7 is a diagram illustrating example resource pools adapted from FIG. 6, in accordance with certain aspects of the present disclosure.

According to aspects of the disclosure, the UE may compare a measured level of channel congestion for the channel to a threshold level of channel congestion and adjust the $n_1$ and/or $n_2$ parameters (e.g., adjust the sensing duration and/or the transmission/reception duration). For example, the UE may adjust the $n_1$ parameter (i.e., the sensing duration) to 1 and the $n_2$ parameter (i.e., the transmit/receive duration) to 5, as shown in FIG. 7.

For example, when the congestion is low (e.g., below a threshold level of congestion), the UE may maximize transmission time. Accordingly, the UE may sense in the P2V sensing occasion 702 and transmit and/or receive in next logically consecutive slots in the P2V resource pool, P2V TX/RX occasion 704, P2V TX/RX occasion 706, P2V TX/RX occasion 708, P2V TX/RX occasion 710, P2V TX/RX occasion 712. The UE may perform sensing again at P2V sensing occasion 714, and so on.

According to some aspects, the sensing duration (m) may be equal to zero. In this case, another device (e.g., a V-UE) may perform the channel congestion measurement and send an indication to the UE; therefore, the UE may not be performing the channel measurement. Based on the indicated channel measurement, the UE may determine the sensing and transmission duration (e.g., the $n_1$ and $n_2$ parameters) to adapt the sensing/transmission scheme accordingly.

According to certain aspects, the UE may vary or randomly select frequency resources in the $n_2$ transmission slots to further avoid collisions. For example, the UE may randomly choose physical resource blocks (PRBs) for each of its transmissions in the $n_2$ slots from the resource availability map obtained from the sensing phase.

According to certain aspects, the UE may also adapt its transmission power for the $n_2$ transmissions (e.g., $P_t = \alpha P_{max}$), where $P_t$ is the transmission power of the UE and $P_{max}$ is the maximum transmit power, and $0 \le \alpha \le 1$. The UE may adjust the transmit power (e.g., select/apply the α parameter) when the UE has not received paging (e.g., from any V-UE) in a time window of T seconds/slots.

Figure 8:
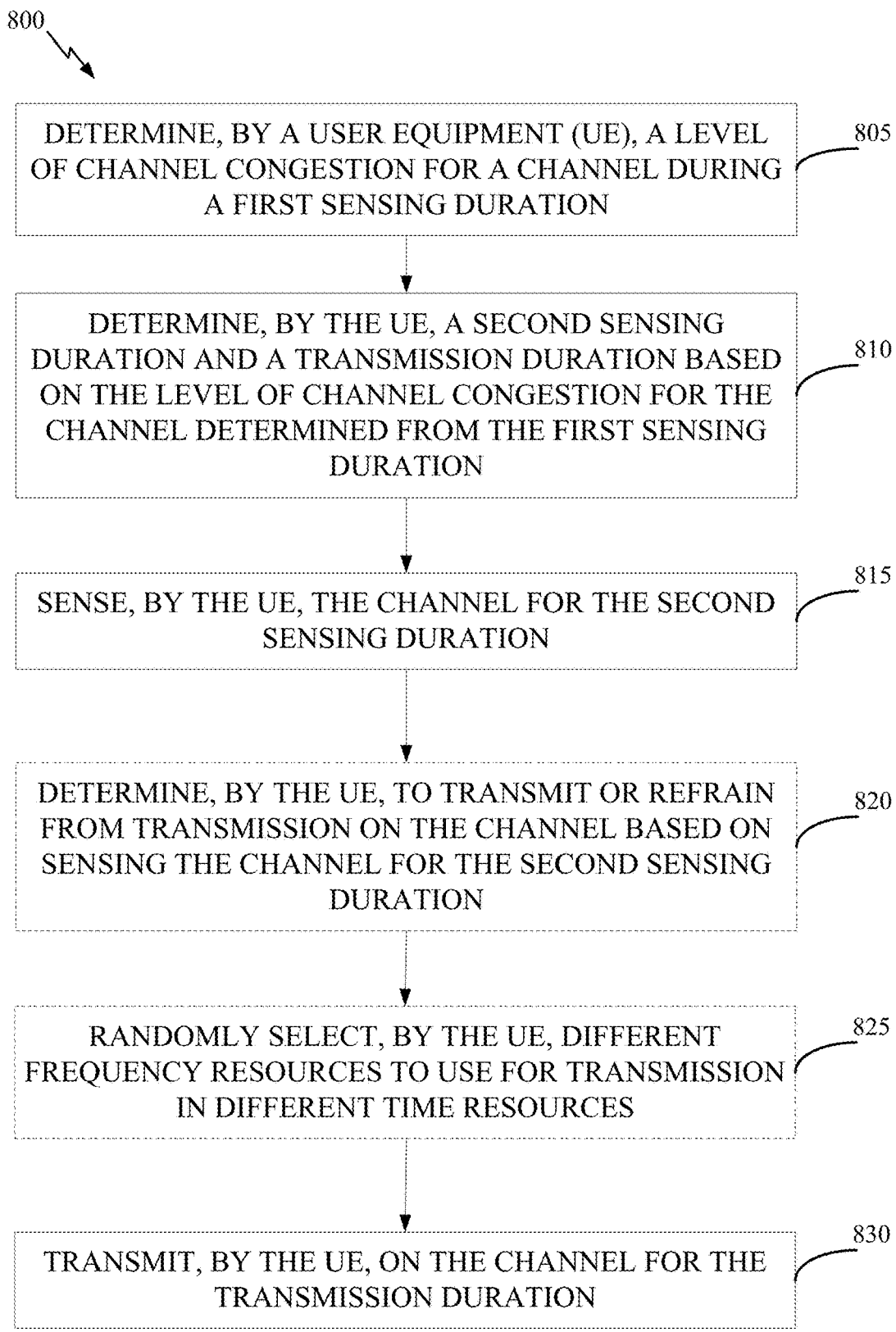
FIG. 8 is a flow diagram illustrating example operations for wireless communication by a UE, in accordance with certain aspects of the present disclosure.

FIG. 8 is a flow diagram illustrating example operations 800 for wireless communications, in accordance with certain aspects of the present disclosure. The operations 800 may be performed, for example, by a UE (e.g., such as a UE 120a or 120b in the wireless communication network 100, which may be a P-UE). In some examples, the UE is a P-UE in a V2P safety system.

Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 may begin, at block 805, by a UE determining a level of channel congestion for a channel during a first sensing duration. For example, the UE may determine CBR, a percentage of free resources based on control information, a channel quality measurement, and/or a signal strength measurement. Determining the level of channel congestion for the channel may involve performing channel congestion measurements. Determining the level of channel congestion for the channel may include receiving an indication of the level of channel congestion from a sidelink UE, a BS, and/or a V-UE.

At block 810, the UE determines a second sensing duration and a transmission duration based on the level of channel congestion for the channel (e.g., determined from the first sensing duration at block 805). In some examples, the UE may adaptively determine a ratio of sensing time to transmission time based on the level of channel congestion for the channel. The UE may determine a longer sensing duration when the determined level of channel congestion for the channel is higher, and the UE may determine a shorter sensing duration when the determined level of channel congestion for the channel is lower. In some examples, the UE may compare the level of channel congestion for the channel to a threshold, and the UE may adjust the second sensing duration based on whether the level of channel congestion for the channel exceeds the threshold. In some examples, the UE may select the second sensing duration based on a configured mapping of levels of channel congestion for the channel to sensing durations.

In some examples, the UE determines resources from a P2V resource pool to use for sensing the channel. In some examples, the P2V resource pool is time division multiplexed (TDMed) with non-P2V pool resources. In some examples, the UE randomly selects different frequency resources to use for transmission in different time resources.

At block 815, the UE senses the channel for the second sensing duration.

In some examples, optionally, at block 820, the UE determines to transmit or refrain from transmission on the channel based on sensing the channel for the second sensing duration. For example, the UE senses (and/or receives) in the m logically consecutive slots in the P2V resource pool. Based on the sensing, the UE may determine to continue sensing (e.g., adapt the sensing time) or stop sensing and begin transmitting (e.g., in the next available P2V TX/RX occasion).

In some examples, optionally, at block 825, the UE randomly selects, different resources to use for transmission in different time resources.

At block 830, the UE transmits on the channel for the transmission duration. For example, the UE transmits (and/or receives) in the $n_2$ logically consecutive slots in the P2V resource pool. In some examples, the UE adaptively determines a transmission power to use for transmitting based on a duration since paging was received.

In some examples, the UE determines a first number of consecutive slots for sensing the channel and a second number of consecutive slots for transmitting to a V-UE. The first and second number of slots may be adaptively determined based on the level of channel congestion for the channel. The first and second number of slots may be determined further based on a target ratio of sensing time to transmission time. In some examples, the UE adaptively determines the target ratio based on the level of channel congestion for the channel.

Figure 9:
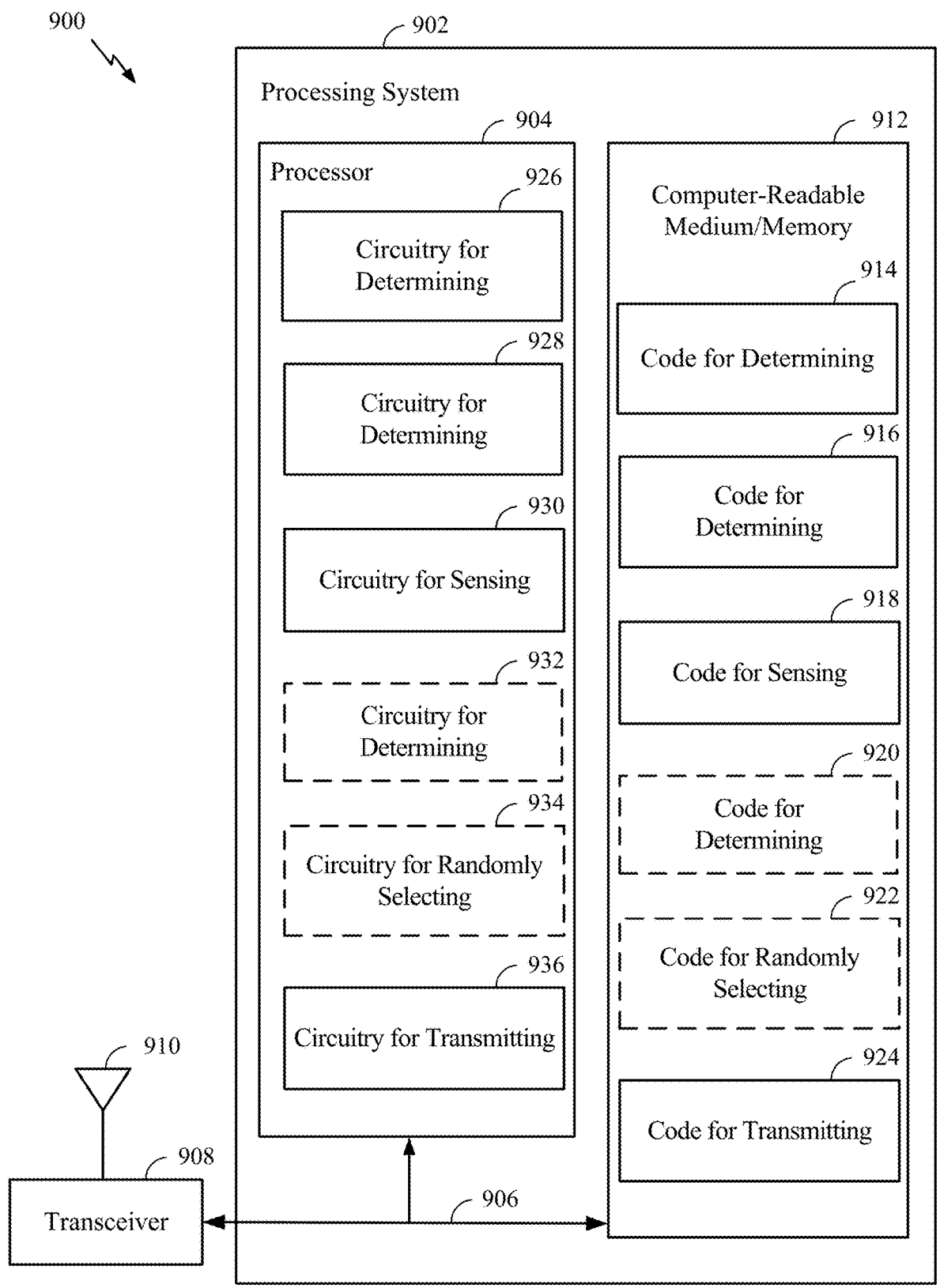
FIG. 9 illustrates a communications device that may include various components configured to perform operations for the techniques disclosed herein, in accordance with certain aspects of the present disclosure.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 8, or other operations for performing the various techniques discussed herein for coordinated sidelink power savings configurations. In certain aspects, computer-readable medium/memory 912 stores code 914 for determining (e.g., for determining a level of channel congestion for a channel during a first sensing duration); code 916 for determining (e.g., for determining a second sensing duration and a transmission duration based on the level of channel congestion for the channel); code 918 for sensing (e.g., for sensing the channel for the second sensing duration); code 920 for determining (e.g., for determining to transmit or refrain from transmission on the channel based on sensing the channel for the second sensing duration); code 922 for randomly selecting (e.g., for randomly selecting different frequency resources to use for transmission in different time resources); and/or code 924 for transmitting (e.g., for transmitting on the channel for the transmission duration). In certain aspects, the processor 904 has circuitry configured to implement the code stored in the computer-readable medium/memory 912. The processor 904 includes circuitry 926 for determining (e.g., for determining a level of channel congestion for a channel during a first sensing duration); circuitry 928 for determining (e.g., for determining a second sensing duration and a transmission duration based on the level of channel congestion determined from the first sensing duration); circuitry 930 for sensing (e.g., for sensing the channel for the second sensing duration); circuitry 932 for determining (e.g., for determining to transmit or refrain from transmission on the channel based on sensing the channel for the second sensing duration); circuitry 934 for randomly selecting (e.g., for randomly selecting different frequency resources to use for transmission in different time resources); and/or circuitry 936 for transmitting (e.g., for transmitting on the channel for the transmission duration).

Example Aspects

Aspect 1: A method for wireless communications by a user equipment (UE), comprising: determining a level of channel congestion for a channel during a first sensing duration; determining a second sensing duration and a transmission duration based on the level of channel congestion for the channel; sensing the channel for the second sensing duration; and transmitting on the channel for the transmission duration.

Aspect 2: The method of Aspect 1, further comprising: determining to transmit or refrain from transmission on the channel based on sensing the channel for the second sensing duration.

Aspect 3: The method of Aspect 1 or 2, wherein determining the second sensing duration comprises: adaptively determining a ratio of sensing time to transmission time based on the level of channel congestion for the channel; and determining the second sensing duration and the transmission duration based on the ratio of sensing time to transmission time.

Aspect 4: The method of any of Aspects 1-3, wherein determining the second sensing duration comprises: determining a longer duration for the second sensing duration when the level of channel congestion for the channel is higher than a duration for the second sensing duration when the level of channel congestion for the channel is lower.

Aspect 5: The method of Aspect 4, wherein determining the second sensing duration comprises: comparing the level of channel congestion for the channel to a threshold level of channel congestion; and adjusting the second sensing duration based on whether the level of channel congestion for the channel exceeds the threshold level of channel congestion.

Aspect 6: The method of Aspect 4 or 5, wherein determining the second sensing duration comprises: selecting the second sensing duration based on a configured mapping of levels of channel congestion for the channel to sensing durations.

Aspect 7: The method of any of Aspects 1-6, wherein determining the level of channel congestion comprises determining a channel busy ratio (CBR).

Aspect 8: The method of any of Aspects 1-7, wherein determining the level of channel congestion comprises determining a percentage of free resources based on control information.

Aspect 9: The method of any of Aspects 1-8, wherein determining the level of channel congestion comprises determining a channel quality measurement.

Aspect 10: The method of any of Aspects 1-9, wherein determining the level of channel congestion comprises determining a signal strength measurement.

Aspect 11: The method of any of Aspects 1-10, wherein determining the level of channel congestion comprises performing channel congestion measurements.

Aspect 12: The method of any of Aspects 1-11, wherein determining the level of channel congestion comprises receiving an indication of the level of channel congestion for the channel from a sidelink UE.

Aspect 13: The method of any of Aspects 1-12, wherein determining the level of channel congestion comprises receiving an indication of the level of channel congestion for the channel from a base station (BS).

Aspect 14: The method of any of Aspects 1-13, wherein determining the level of channel congestion comprises receiving an indication of the level of channel congestion for the channel from a vehicle UE (V-UE).

Aspect 15: The method of any of Aspects 1-14, wherein the UE comprises a pedestrian UE (P-UE).

Aspect 16: The method of Aspect 15, wherein determining the second sensing duration comprises determining resources from a pedestrian-to-vehicle (P2V) resource pool to use for sensing the channel, and wherein the P2V resource pool is time division multiplexed (TDMed) with one or more non-P2V resource pools.

Aspect 17: The method of Aspect 15 or 16, wherein: determining the second sensing duration comprises determining a first number of consecutive slots for sensing the channel; determining the transmission duration comprises determining a second number of consecutive slots for transmitting to a vehicle UE (V-UE); and the first number of consecutive slots and the second number of consecutive slots are adaptively determined based on the level of channel congestion for the channel.

Aspect 18: The method of Aspect 17, wherein the first number of consecutive slots and the second number of consecutive slots are determined further based on a target ratio of sensing time to transmission time.

Aspect 19: The method of Aspect 18, further comprising adaptively determining the target ratio of sensing time to transmission time based on the level of channel congestion for the channel.

Aspect 20: The method of any of Aspects 15-19, wherein the P-UE is in a vehicle to pedestrian (V2P) safety system.

Aspect 21: The method of any of Aspects 1-20, further comprising randomly selecting different frequency resources to use for transmission in different time resources.

Aspect 22: The method of any of Aspects 1-21, further comprising adaptively determining a transmission power to use for transmitting on the channel based on a duration since paging was received.

Aspect 23: An apparatus comprising at least one processor and a memory coupled to the at least one processor, the memory comprising code executable by the at least one processor to cause the apparatus to perform the method of any of aspects 1-22.

Aspect 24: A computer readable medium storing computer executable code thereon for wireless communications that, when executed by at least one processor, cause an apparatus to perform the method of any of aspects 1-22.

Aspect 25: An apparatus comprising at least one means for performing a method of any of aspects 1-22.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a pedestrian user equipment (P-UE), comprising:
a memory; and
at least one processor coupled with the memory and configured to:
determine a level of channel congestion for a channel during a first sensing duration;
determine, from a pedestrian-to-vehicle (P2V) resource pool, a second sensing duration to use for sensing the channel and a transmission duration based on the level of channel congestion for the channel, wherein the P2V resource pool is time division multiplexed (TDMed) with one or more non-P2V resource pools;
sense the channel for the second sensing duration; and
transmit on the channel for the transmission duration.

2. The apparatus of claim 1, wherein the at least one processor coupled with the memory is further configured to:
determine to transmit or refrain from transmission on the channel based on sensing the channel for the second sensing duration.

3. The apparatus of claim 1, wherein the at least one processor coupled with the memory is configured to:
adaptively determine a ratio of sensing time to transmission time based on the level of channel congestion for the channel; and
determine the second sensing duration and the transmission duration based on the ratio of sensing time to transmission time.

4. The apparatus of claim 1, wherein the at least one processor coupled with the memory is configured to:
determine a longer duration for the second sensing duration when the level of channel congestion for the channel is higher than a duration for the second sensing duration when the level of channel congestion for the channel is lower.

5. The apparatus of claim 4, wherein the at least one processor coupled with the memory is configured to:
compare the level of channel congestion for the channel to a threshold level of channel congestion; and
adjust the second sensing duration based on whether the level of channel congestion for the channel exceeds the threshold level of channel congestion.

6. The apparatus of claim 4, wherein the at least one processor coupled with the memory is configured to:
select the second sensing duration based on a configured mapping of levels of channel congestion for the channel to sensing durations.

7. The apparatus of claim 1, wherein the at least one processor coupled with the memory is configured to determine the level of channel congestion for the channel including determining a channel busy ratio (CBR).

8. The apparatus of claim 1, wherein the at least one processor coupled with the memory is configured to determine the level of channel congestion for the channel including determining a percentage of free resources based on control information.

9. The apparatus of claim 1, wherein the at least one processor coupled with the memory is configured to determine the level of channel congestion for the channel including determining a channel quality measurement.

10. The apparatus of claim 1, wherein the at least one processor coupled with the memory is configured to determine the level of channel congestion for the channel including determining a signal strength measurement.

11. The apparatus of claim 1, wherein the at least one processor coupled with the memory is configured to determine the level of channel congestion for the channel including performing channel congestion measurements.

12. The apparatus of claim 1, wherein the at least one processor coupled with the memory is configured to determine the level of channel congestion for the channel including receiving an indication of the level of channel congestion for the channel from a sidelink UE.

13. The apparatus of claim 1, wherein the at least one processor coupled with the memory is configured to determine the level of channel congestion for the channel including receiving an indication of the level of channel congestion for the channel from a base station (BS).

14. The apparatus of claim 1, wherein the at least one processor coupled with the memory is configured to determine the level of channel congestion for the channel including receiving an indication of the level of channel congestion for the channel from a vehicle UE (V-UE).

15. An apparatus for wireless communications by a pedestrian user equipment (P-UE), comprising:
a memory; and
at least one processor coupled with the memory and configured to:
determine a level of channel congestion for a channel during a first sensing duration;
adaptively determine a second sensing duration including a first number of consecutive slots for sensing the channel based on the level of channel congestion for the channel;
adaptively determine a transmission duration including a second number of consecutive slots for transmitting to a vehicle UE (V-UE) based on the level of channel congestion for the channel;
sense the channel for the second sensing duration; and
transmit on the channel for the transmission duration.

16. The apparatus of claim 15, wherein the at least one processor coupled with the memory is configured to adaptively determine the first number of consecutive slots and the second number of consecutive slots further based on a target ratio of sensing time to transmission time.

17. The apparatus of claim 16, wherein the at least one processor coupled with the memory is further configured to adaptively determine the target ratio of sensing time to transmission time based on the level of channel congestion for the channel.

18. The apparatus of claim 1, wherein the P-UE is in a vehicle to pedestrian (V2P) safety system.

19. The apparatus of claim 1, wherein the at least one processor coupled with the memory is further configured to randomly select different frequency resources to use for transmission in different time resources.

20. An apparatus for wireless communications by a user equipment (UE), comprising:
a memory; and
at least one processor coupled with the memory and configured to:
determine a level of channel congestion for a channel during a first sensing duration;
determine a second sensing duration to use for sensing the channel and a transmission duration based on the level of channel congestion for the channel;
adaptively determine a transmission power to use for transmitting on the channel based on a duration since paging was receive;
sense the channel for the second sensing duration; and
transmit on the channel for the transmission duration using the transmission power.

21. A method for wireless communications by a pedestrian user equipment (P-UE), comprising:
adaptively determining a level of channel congestion for a channel during a first sensing duration;
adaptively determining a second sensing duration including a first number of consecutive slots for sensing the channel based on the level of channel congestion for the channel;
adaptively determining a transmission duration including a second number of consecutive slots for transmitting to a vehicle UE (V-UE) based on the level of channel congestion for the channel;
sensing the channel for the second sensing duration; and
transmitting on the channel for the transmission duration.

22. The method of claim 21, further comprising:
determining to transmit or refrain from transmission on the channel based on the channel sensing.

23. The method of claim 21, wherein determining the second sensing duration comprises adaptively determining a ratio of sensing time to transmission time based on the level of channel congestion for the channel.

24. The method of claim 21, wherein determining the second sensing duration comprises:
  determining a longer duration for the second sensing duration when the level of channel congestion for the channel is higher than a duration for the second sensing duration when the level of channel congestion for the channel is lower.

25. The method of claim 24, wherein determining the second sensing duration comprises:
  comparing the level of channel congestion for the channel to a threshold level of channel congestion; and
  adjusting the second sensing duration based on whether the level of channel congestion for the channel exceeds the threshold level of channel congestion.

26. The method of claim 24, wherein determining the second sensing duration comprises:
  selecting the second sensing duration based on a configured mapping of levels of channel congestion for the channel to sensing durations.

27. The method of claim 21, wherein determining the level of channel congestion for the channel includes performing channel congestion measurements.

28. The method of claim 21, wherein determining the level of channel congestion for the channel comprises receiving an indication of the level of channel congestion for the channel from a sidelink UE.

\* \* \* \* \*